(No Model.) 4 Sheets—Sheet 1.
W. ROWBOTHAM.
GALVANIC BATTERY.
No. 602,362. Patented Apr. 12, 1898.
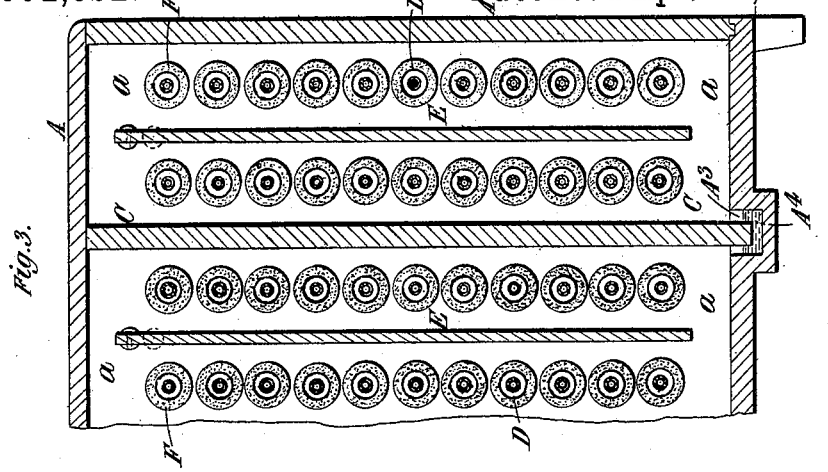
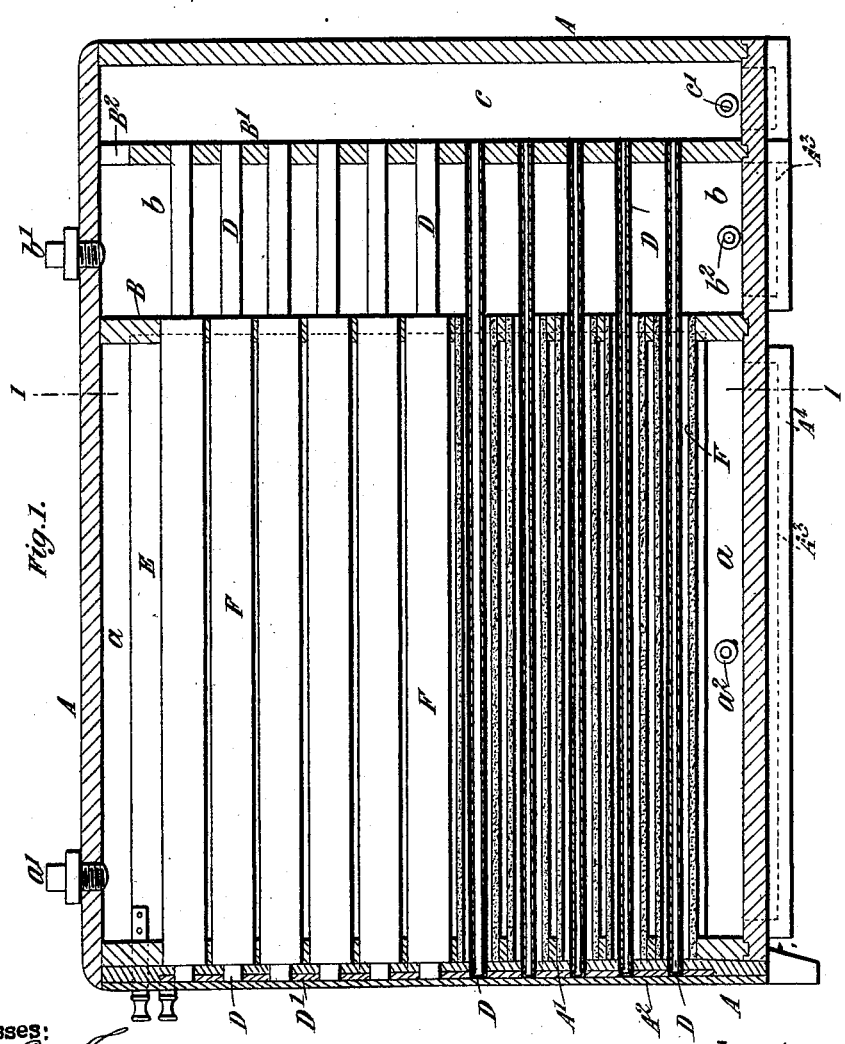
Witnesses:
Inventor:
Walter Rowbotham (No Model.) 4 Sheets—Sheet 2.
W. ROWBOTHAM.
GALVANIC BATTERY.
No. 602,362. Patented Apr. 12, 1898.
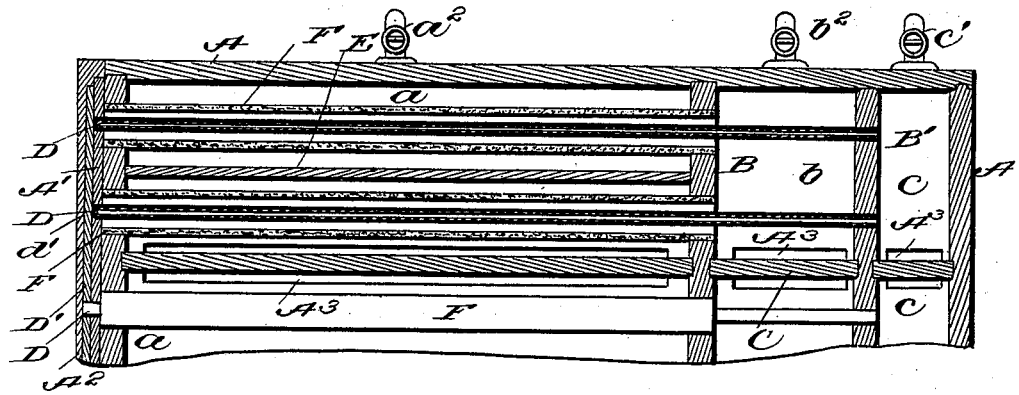
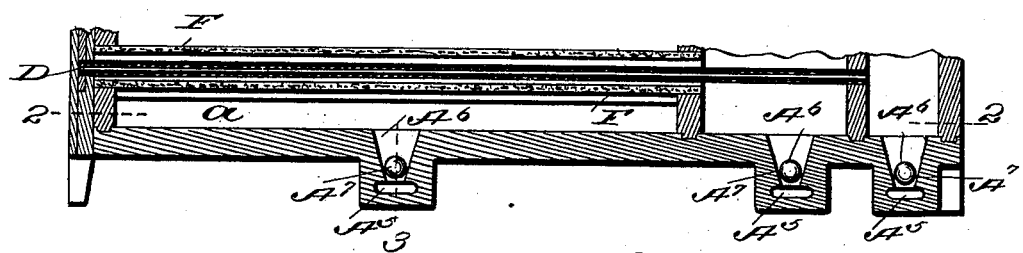
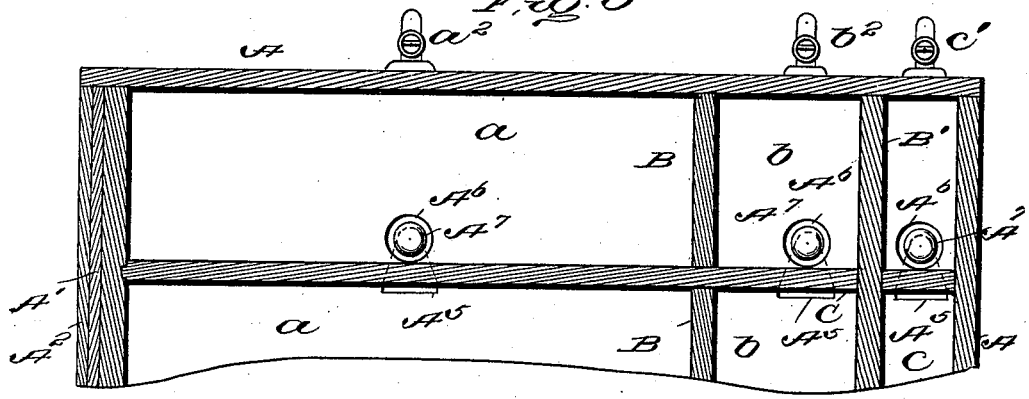
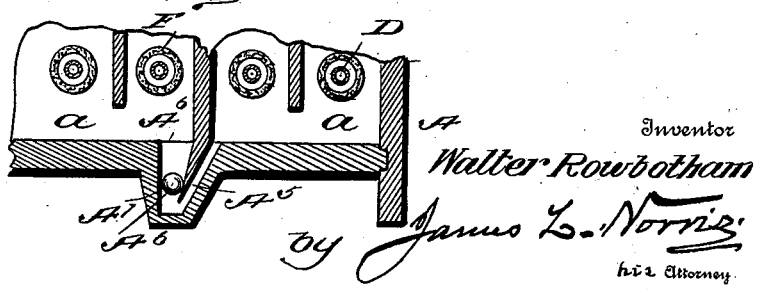
Witnesses
Inventor
Walter Rowbotham
by James L. Norris
his Attorney

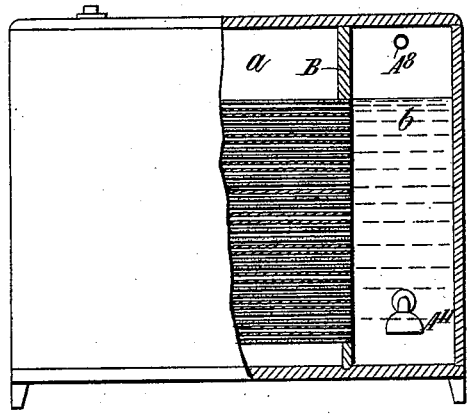
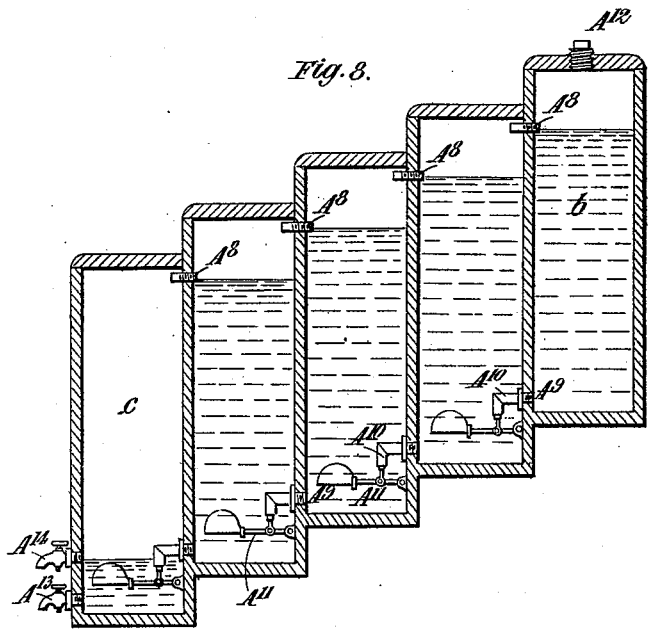

(No Model.) W. ROWBOTHAM. 4 Sheets—Sheet 4.
GALVANIC BATTERY.
No. 602,362. Patented Apr. 12, 1898.
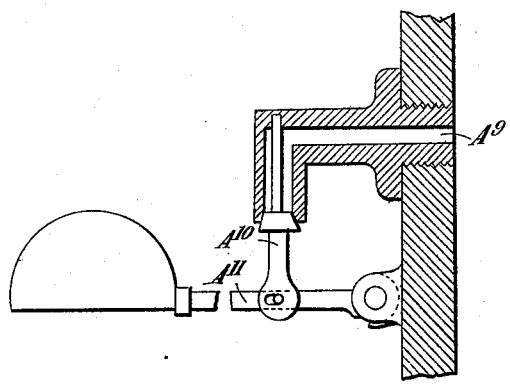
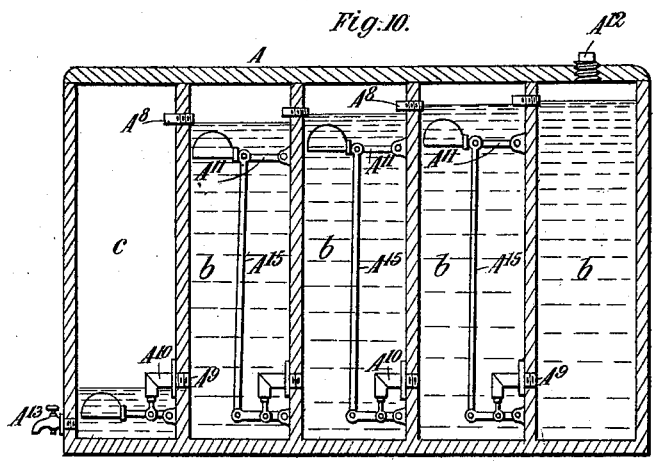
Witnesses
Inventor
Walter Rowbotham
by James L. Norris
attorney

UNITED STATES PATENT OFFICE.

WALTER ROWBOTHAM, OF BIRMINGHAM, ENGLAND.

GALVANIC BATTERY.

SPECIFICATION forming part of Letters Patent No. 602,362, dated April 12, 1898.

Application filed December 16, 1896. Serial No. 615,893. (No model.)

*To all whom it may concern:*

Be it known that I, WALTER ROWBOTHAM, electrical engineer, a subject of the Queen of Great Britain, residing at 27 Vittoria street, Birmingham, England, have invented certain new and useful Improvements in Galvanic Batteries, of which the following is a specification, reference being had to the accompanying drawings.

This invention has reference more especially to two-fluid primary electric batteries in which tubular carbon elements and metal elements, such as iron or zinc, are employed.

According to my present invention I construct the battery with a hermetically-closed outer vessel or casing within which the gas or gases generated during the working of the battery are permitted to accumulate under pressure, which pressure assists in effecting depolarization.

Heretofore when batteries have been constructed with hermetically-closed outer vessels or casings considerable difficulty has been experienced in constructing them strong enough to effectually resist the internal pressure arising during the working of the battery. I find that this internal pressure is due to the increase in the bulk of the liquid in the carbon-element cells. This increase in the bulk of the liquid causes a very great pressure to be exerted within the casing, such pressure becoming eventually so excessive that the casing, even if made of great strength, has been unable to resist it without becoming fractured or bursting. Now according to my invention I construct my improved battery in such a manner that this pressure is altogether avoided, so that the casing will not be subjected to any injurious internal strain from such cause. A convenient means for avoiding this pressure consists in providing an overflow or liquid-expansion chamber or chambers within the casing, so that as the liquid increases in bulk, as above stated, ample room will be provided for its reception, such chamber or chambers being preferably so arranged that the overflow or surplus liquid is still available for depolarization.

I also provide my improved battery with means whereby the drawing off of liquid from one of the series of compartments, chambers, or cells will effect the emptying of all the other cells, and, vice versa, the introduction of fresh liquid into one of the cells will effect the filling of all the other cells, these means being such that during the emptying and filling operations communication is automatically established between the cells and automatically closed again after an emptying or filling operation has been completed.

In order that my invention may be clearly understood and readily carried into effect, I will proceed to describe the same with reference to the accompanying drawings, in which—

Figure 1 is a vertical section, Fig. 2 a horizontal section, and Fig. 3 a transverse section, taken on the line 1 1, showing my improved electric battery. Figs. 4, 5, and 6 are similar views showing modified means for automatically opening and closing communication between the cells during the emptying operations. Fig. 7 is a sectional elevation, and Fig. 8 is a longitudinal section, taken through the depolarizing-liquid compartments, showing a further modification of my invention. Fig. 9 is an enlarged detail section showing a float-valve, whose purpose will be hereinafter described. Fig. 10 is a modification of the arrangement illustrated in Fig. 8.

A is the hermetically-closed outer vessel or casing of the battery. B is a partition that divides the said outer vessel into two main compartments *a* and *b*, one of which is further divided by another partition B', so as to produce the liquid-expansion chamber *c*.

C C are transverse partitions dividing the main compartments into subcompartments or cells.

D D are the carbon elements, and E E are the metallic elements, which are preferably of iron or zinc.

The aforesaid carbon elements are preferably in the form of tubes with one end closed and are arranged horizontally with their open ends communicating with the chamber *c*. These tubular carbons are of such a length that their inner ends extend into the partition B', so that the interior of each of the said tubular carbons is open to the liquid-expansion chamber *c*. For separating the carbon elements from the metal elements I employ porous tubes F, which surround the tubular carbons where the latter pass through the compartment $a$. These porous tubes are open to the compartment $b$, but are closed at their opposite ends, and their diameter is such that an annular space is left between the exterior of the carbons and the interior of the porous tubes, so that the depolarizing liquid contained in the compartment $b$ can have free access to the interior of the said porous tubes and completely surround the carbons. The depolarizing liquid I prefer to employ in this compartment $b$ is a mixture of sulfuric and nitric acids in the proportion of about one part of sulfuric acid to about one to six parts of nitric acid, the sulfuric acid being of a strength approximating a specific gravity 1.790 and the nitric acid 1.48. Other depolarizing liquid may, however, be employed.

In the compartments $a$, wherein the iron or zinc elements are arranged, I prefer to employ a strong solution of sal-ammoniac or nitrate of soda, which is well known and understood.

$a'$ and $b'$ are screw-plugs for closing the openings through which the aforesaid liquids are poured into the vessel A for charging the battery.

D D' are current-collecting plates consisting of strips of copper to which the outer ends of the tubular carbons are connected. Between the said current-collecting plates and the outer ends of the porous tubes I prefer to place some material A' that will act to produce a fluid-tight joint, and for this purpose I find a mixture of bitumen and ozocerite advantageous.

The outer ends of the carbon tubes and the current-collecting plates are protected by means of a cover-plate $A^2$.

When the compartments $a$ and $b$ are charged with their respective exciting and depolarizing liquids, it will be observed that the interior of the tubular carbons remains empty, owing to the fact that their open ends communicate with the liquid-expansion chamber $c$, and this compartment is not charged with liquid. When, however, the battery is working, the surplus liquid and gases that are generated in compartment $b$ are enabled to escape through an opening $B^2$ at the upper end of the partition $B'$, and thereby reach and enter the chamber $c$. During the working of the battery the bulk of the depolarizing liquid in compartment $b$ gradually increases and passes through the aforesaid opening $B^2$ into the chamber $c$. This surplus liquid as it rises in the said chamber $c$ enters the lower tubular carbons, and thus enables me to further utilize such liquid, so that any depolarizing virtue it may still possess will be completely used up before it is drawn off from the battery as spent liquid by the cock at $c'$.

In some cases—as, for instance, when I arrange the expansion-chamber in the manner shown in Figs. 8, 9, and 10—the tubular carbons do not extend through the compartment $b$, but terminate at the partition B, as in Fig. 7, so that their open ends are in communication with the depolarizing liquid in the compartment $b$. Instead of employing tubular carbons I may use carbon rods.

I will now describe the means for enabling the battery liquids to be withdrawn when spent, referring first to the arrangement illustrated in Figs. 1, 2, and 3.

The bottom of the outer vessel A is formed with cavities $A^3$, into which the lower ends of the partitions enter, without, however, extending completely to the bottom thereof. Into these cavities I place a substance $A^4$, that not only has a higher specific gravity than the battery fluids employed, but is a bad electric conductor and is also not materially affected by the fluids. I prefer to use an insoluble substance, such as sand. Assuming the battery to have been filled with the liquids and the aforesaid substance to have settled at the bottom of the cavities, as shown in Fig. 3, each cell will be isolated from the other by reason of this substance closing or sealing the openings between the cells, so that one cell cannot short-circuit the other during the working of the battery. Now if it be desired to draw off the liquids from the battery the cocks $a^2$, $b^2$, and $c'$ are opened. The liquid in the compartments nearest these cocks then commences to flow away, and the level of the liquid falling in such compartments produces a difference in level between the liquids in these compartments and the contiguous ones. The weight of liquid acting on the substance $A^4$ is therefore not equal on both sides of the partition C, and consequently the said substance is displaced from one side of the partition C to the other, with the result that communication is established between the contiguous compartments and the liquids they contain flow away from each of them. A difference in liquid-level then occurs between the next contiguous compartments, with the result that the liquids therein also flow away, this difference in liquid-level taking place successively in all the compartments until they are all emptied of their liquid contents. The said substance $A^4$, being then no longer subjected to an unequal pressure, resumes its normal position at the bottom of the cavities by the action of gravity, and therefore again isolates one cell from the other. When the battery is being charged with liquids, the aforesaid substances $A^4$ acts in analogous manner to open and close the communication between the various cells.

In Figs. 4, 5, and 6 I have shown a series of passages $A^5$, which pass from one side to the other of each of the partitions C; but in this case each of the aforesaid passages opens on one side of the partitions C into a conical cavity or recess $A^6$, which is provided with a glass or other suitable spherical body $A^7$. This spherical body or ball acts as a valve, which opens only in one direction. When the cocks for drawing off the liquids are opened, the aforesaid balls A⁷ will rise under pressure due to the inequality of liquid in contiguous cells. After each emptying and filling operation the said balls resume their closed position under the action of gravity.

In Figs. 8 and 9 I have shown a modification of the automatic emptying and filling contrivance in which float-valves are employed instead of simple balls. In this case the battery-cells are arranged in cascade form, Fig. 8, and communication between the various cells is established by passages or short tubes $A^8$ near the top of the cells and by passages $A^9$ near the bottom of the cells, these last-mentioned passages being provided with downwardly-opening valves $A^{10}$, controlled by float-levers $A^{11}$. $A^{12}$ is the filling-plug, and $A^{13}$ the emptying-tap. Assume that all the cells or compartments $b$ are empty and that a recharging operation is to be performed. All the valves $A^{10}$ will at this time be open, owing to the float-levers being in their lowered position. The fresh liquid is admitted through the plug $A^{12}$ and will rise in the highest compartment until it is able to escape through the open passage $A^9$ into the next compartment, where it also rises until it is able to escape into the next succeeding compartment, and so on until the liquid has risen in all of the compartments to such an extent as to cause the various float-levers to rise and shut the valves $A^{10}$. The liquid then continues to rise in the highest compartment until it reaches the tube $A^8$, through which it flows into the next compartment and rises therein until it reaches the tube $A^8$ in this compartment, and so on until all the compartments are charged. In order to avoid overcharging of the compartments, the lowermost one is furnished with a second tap $A^{14}$. By leaving this tap open during the filling operation it serves to indicate when all the compartments are sufficiently filled by allowing the surplus liquid to flow through it. It will be observed that this tap $A^{14}$ is situated at a comparatively short distance from the bottom of the lowermost compartment, so that the level of liquid in such compartment rises only a short distance and leaves the upper part of the compartment empty to serve as the expansion-chamber $c$ for all the other compartments. To empty the battery of liquid, the tap $A^{13}$ is opened. The liquid in the lowermost compartment will then escape, and when the level of the liquid therein falls sufficiently to allow the float-valve to descend and open the valve $A^{10}$ the liquid in the next compartment will flow away through said valve and reach the outlet-tap $A^{13}$ by passing through the lowermost compartment. As the level of liquid falls in the various compartments the valves $A^{10}$ successively open, and thus permit all the liquid to escape.

Instead of arranging the cells at different levels, as shown in Fig. 8, they may be arranged all on the same level, as illustrated in Fig. 10, and then the float-levers $A^{11}$ would be situated near the top of the cells and be connected to the valves $A^{10}$ by means of connecting-rods $A^{15}$. As the liquid in the expansion-chamber $c$ is at a low level, the float-lever of the valve in this chamber is situated near the bottom thereof, as in Fig. 8.

What I claim is—

1. In a hermetically-sealed electric battery, the combination of the depolarizing-liquid compartment and the liquid-expansion chamber located in juxtaposition to one another within the sealed battery, and tubular carbon elements communicating with said expansion-chamber, substantially as and for the purposes described.

2. In a two-fluid electric battery having a hermetically-sealed outer vessel, the combination with the depolarizing-liquid compartment and the liquid-expansion chamber located in juxtaposition to one another within the sealed vessel, of carbon elements communicating with the depolarizing-liquid compartment, and porous tubes surrounding said carbon elements and opening into the depolarizing-liquid compartment, substantially as described.

3. A two-fluid electric battery having a hermetically-sealed outer casing, a depolarizing-liquid compartment and a liquid-expansion chamber arranged beside each other within said casing, an active-liquid compartment, a series of carbon tubes extending horizontally through the metal element compartment and opening into the liquid-expansion chamber, porous tubes surrounding said carbon tubes where they pass through the active-liquid compartment and communicating with the depolarizing-liquid compartment, and a means for enabling each series of the said compartments to be simultaneously emptied or filled with liquid, substantially as described.

4. In an electric battery, the combination with an outer casing having a plurality of series of cells and passages connecting the bottom of each cell with the bottoms of the contiguous cells of the same series, of loose gravity closing-valves controlling said passages, the arrangement being such that the valves remain closed as long as the level of liquid in a series of the cells remains equal, but which are automatically displaced upwardly so as to open the said passages when the level of the liquid in which the said loose valves are situated falls below that of the liquid in an adjacent cell, substantially as described and for the purpose specified.

In testimony whereof I have hereunto set my hand this 10th day of April, 1896.

WALTER ROWBOTHAM.

Witnesses:
ARTHUR A. BERGIN,
WM. MELLERSH JACKSON.